United States Patent [19]
Fouts

[11] Patent Number: 5,875,872
[45] Date of Patent: Mar. 2, 1999

[54] WHIP DAMPENER BRACKET ASSEMBLY FOR VEHICLE BRAKE HOSE SYSTEM

[75] Inventor: Robert E. Fouts, Rancho Palos Verdes, Calif.

[73] Assignee: Earl's Supply Co., Long Beach, Calif.

[21] Appl. No.: 863,734

[22] Filed: May 27, 1997

[51] Int. Cl.⁶ ........................................ F16D 55/00
[52] U.S. Cl. ................. 188/71.1; 138/125; 138/DIG. 3; 248/60
[58] Field of Search ..................... 188/152, 208, 188/71.1, 382; 138/103, 106, 107, 110; 384/1, 441; 248/56, 60, 62, 75, 80, 91, 230, 605, 606; 267/136, 139, 140.11, 140.12, 140.2, 666, 667, 174; 181/208; 81/93; 24/455

[56] References Cited

U.S. PATENT DOCUMENTS

| | | | |
|---|---|---|---|
| 2,712,425 | 7/1955 | Ruemelin | 248/75 |
| 2,788,289 | 4/1957 | Press | 138/55 |
| 4,402,346 | 9/1983 | Cheetham et al. | 138/129 |
| 4,655,614 | 4/1987 | Schott | 384/220 |
| 4,813,517 | 3/1989 | Mann | 188/152 |
| 4,930,733 | 6/1990 | Logsdon | 248/56 |
| 5,460,247 | 10/1995 | Fouts | 188/71.1 |
| 5,727,391 | 3/1998 | Hayward | 60/528 |

*Primary Examiner*—Robert J. Oberleitner
*Assistant Examiner*—C. T. Bartz
*Attorney, Agent, or Firm*—Oppenheimer Wolff & Donnelly LLP

[57] ABSTRACT

A whip dampener mounting bracket assembly is disclosed having a whip dampener member mounted between the brake caliper of a vehicle and the brake master cylinder. The bracket assembly utilizes the preexisting frame bracket of the vehicle and an auxiliary bracket mounted thereto coupled by a flexible spring to a second auxiliary bracket. The whip dampener member is mounted on the second auxiliary bracket. The flexible hose of the assembly passes from the caliper, through the whip dampener, through the first auxiliary bracket and the vehicle frame bracket to the brake master cylinder. This assembly allows the use of preexisting tubing between the vehicle frame bracket and the brake master cylinder without need for coiling the tubing coupling the assembly to the master cylinder. The flexing of the hose is increased.

7 Claims, 2 Drawing Sheets

WHIP DAMPENER BRACKET ASSEMBLY FOR VEHICLE BRAKE HOSE SYSTEM

BACKGROUND OF THE INVENTION

1. Field of the Invention

The invention relates to vehicle braking systems; and, more particularly, to a vehicle brake hose system with a whip dampener for eliminating pulsation and uneven wear of vehicle brake systems that meets Department of Transportation standards.

2. Description of the Related Art

In my U.S. Pat. No. 5,460,247, the teachings of which are incorporated herein of interest, I disclose a hose system for brakes of vehicles adapted to replace the flexible hose of a vehicle that extends from the pre-existing brake caliper of a vehicle through a bracket and to the pre-existing brake master cylinder of the vehicle. The system includes a flexible hose of stainless steel braid protected extruded Teflon material having a whip dampening member mounted on the hose receivable in the pre-existing bracket of the vehicle.

In the system in my 5,460,247 patent, which works quite well, there is a need for providing a portion of flexible hose between the whip dampener and the rigid tubing of the vehicle coupled to the brake master cylinder. This rigid tubing must be coiled to provide the necessary flexing of the system. Thus, preexisting straight rigid tubing cannot be used.

There is a need for providing a bracket assembly for a whip dampener system wherein preexisting straight tubing of a vehicle may be used while retaining the flexing required to carry out the whip dampening desired.

SUMMARY OF THE INVENTION

It is an object of this invention to provide a bracket assembly for a vehicle whip dampener which utilizes preexisting tubing between the dampener and the brake master cylinder while retaining the flexing needed for the whip dampener.

It is still another object of this invention to carry out the foregoing object using the preexisting vehicle frame bracket.

These and other objects are preferably accomplished by providing a whip dampener mounting bracket assembly having a whip dampener member mounted between the brake caliper of a vehicle and the brake master cylinder. The bracket assembly utilizes the preexisting frame bracket of the vehicle and an auxiliary bracket mounted thereto coupled by a flexible spring to a second auxiliary bracket. The whip dampener member is mounted on the second auxiliary bracket. The flexible hose of the assembly passes from the caliper, through the whip dampener, through the first auxiliary bracket and the vehicle frame bracket to the brake master cylinder. This assembly allows the use of preexisting tubing between the vehicle frame bracket and the brake master cylinder without need for coiling the tubing coupling the assembly to the master cylinder. The flexing of the hose is increased.

DESCRIPTION OF THE PREFERRED EMBODIMENT

Figure 1:
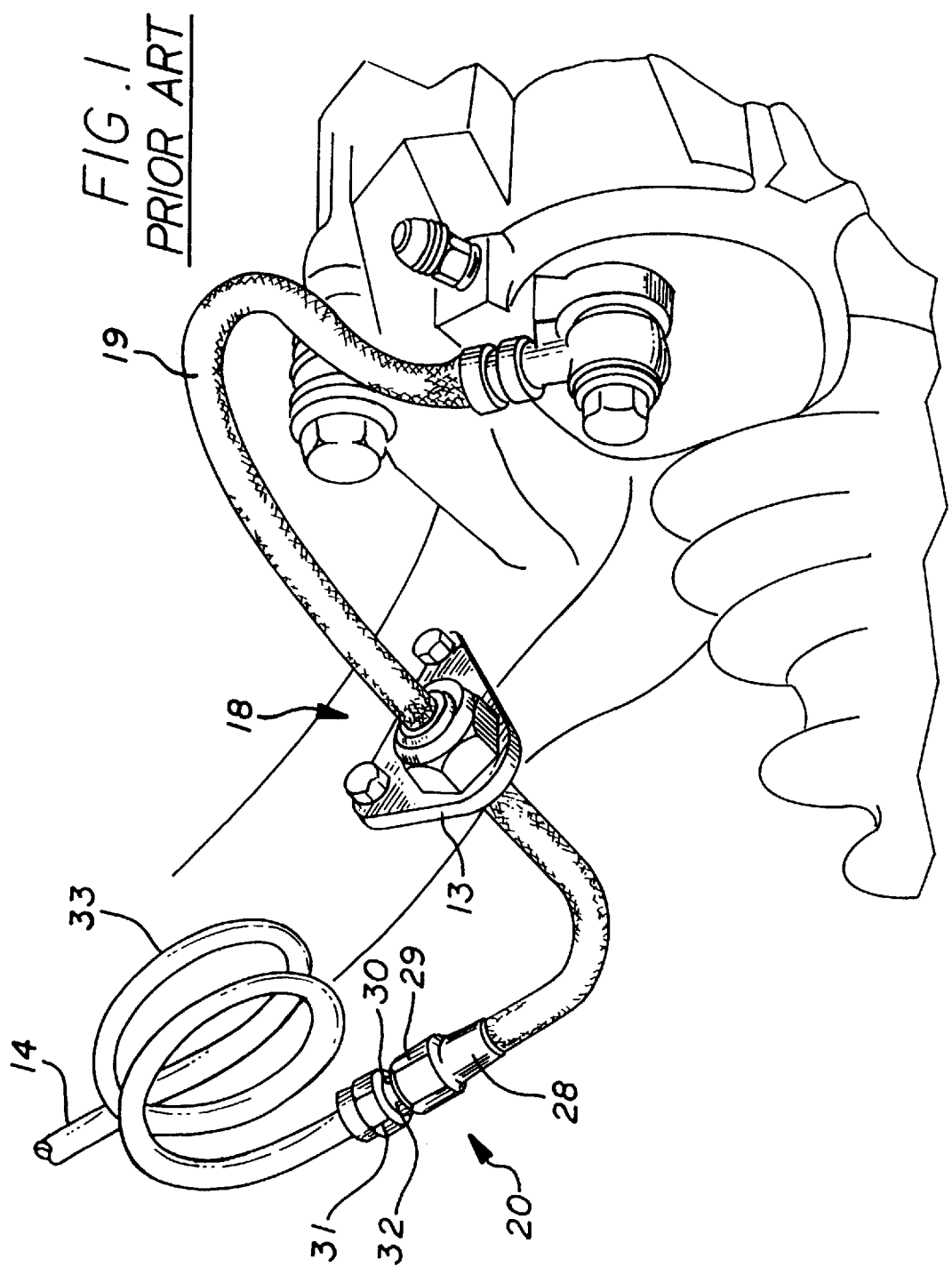
FIG. 1 is a perspective view of the whip dampener assembly disclosed in my U.S. Pat. No. 5,460,247, the teachings of which are incorporated herein by reference.

Referring now to FIG. 1 of the drawing, a prior art whip dampener assembly as disclosed in U.S. Pat. No. 5,460,247 is shown. Thus, a conventional wheel cylinder or brake caliper 10 is shown having a flexible brake hose 19 of a fabric reinforced elastomeric material is connected to caliper 10 via bolt 12. Hose 19 is coupled to a pre-existing conventional bracket 13 mounted to the vehicle chassis 15 via bolts 16. A coiled spring tube 14 is coupled via connector fitting 20 to bracket 13 and extends to the brake master cylinder (not shown) of the vehicle. Thus, in such a typical installation, hydraulic pressure from the brake master cylinder is transmitted through steel tube 14 to bracket 13 with flexible hose 11 leading to the brake caliper 10.

Whip dampening means 18 is shown associated with bracket 13 with hose 19 passing through bracket 13 extending to connector fitting and then to the brake master cylinder (not shown).

Figure 2:
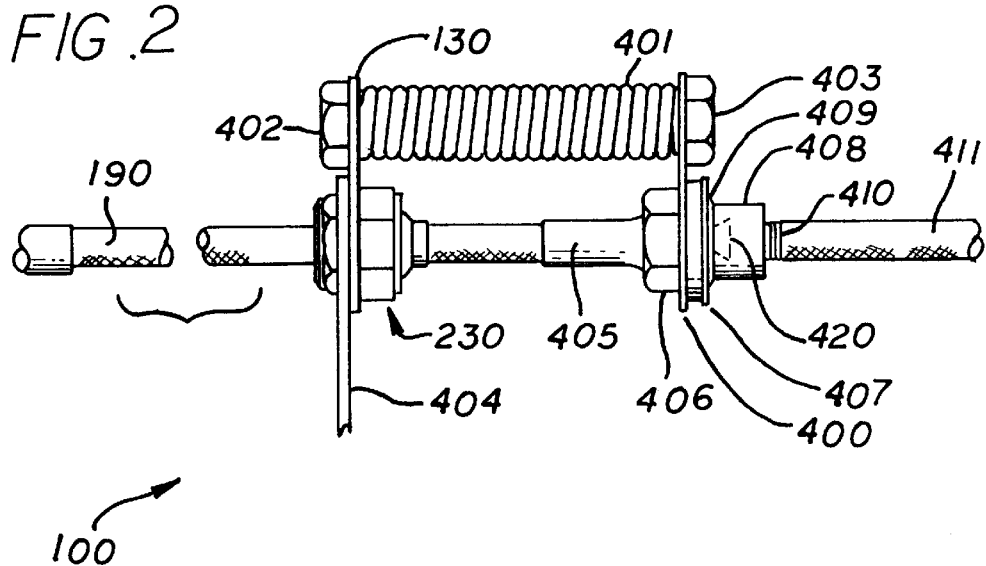
FIG. 2 is a perspective view of a bracket assembly utilizing the whip dampener disclosed in my U.S. Pat. No. 5,460,247.
Figure 3:
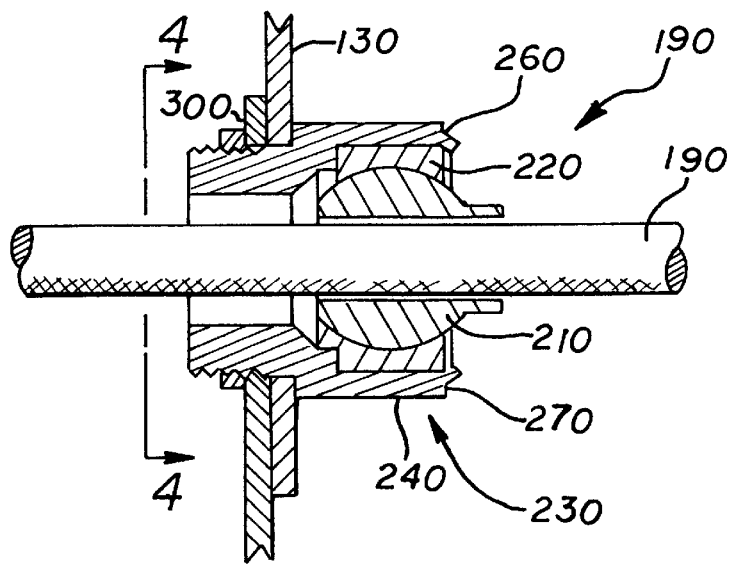
FIG. 3 is a cross-sectional view of the whip dampener and brackets of the assembly of FIG. 2.
Figure 4:
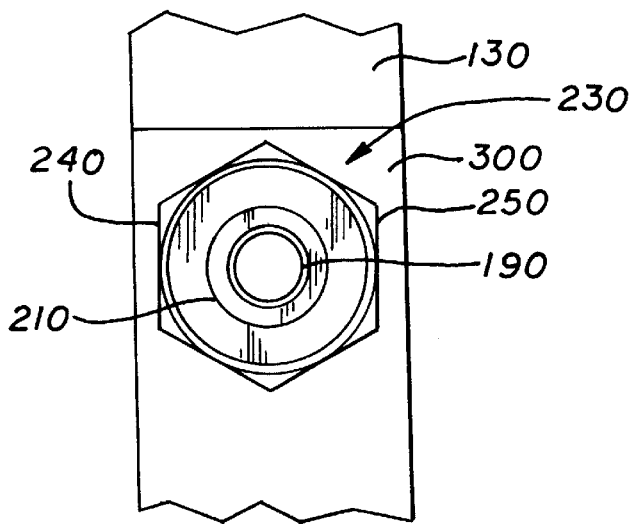
FIG. 4 is a view taken along lines 4—4 of FIG. 3.

Turning now to FIG. 2, as particularly contemplated in the teachings of this invention, a bracket assembly 100 is provided for effecting the necessary flexibility for operating whip dampener 180. It is to be understood that the internal mechanism of whip dampener 180 is essentially the same as in the whip dampeners described and claimed in U.S. Pat. No. 5,460,247. Thus, as seen in FIG. 3, flexible hose 190, of stainless steel braid, as hose 19 in U.S. Pat. No. 5,460,247, passes through bracket 130. Bracket 130 is a first auxiliary bracket coupled to a second auxiliary bracket 400 spaced from bracket 300. Bracket 400 is coupled to bracket 300 by a coiled flexible spring 401. Spring 401 may have bolts 402, 403 at each end securing said bolts in suitable aligned openings in brackets 300, 400, respectively, spring 401 encircling the shafts of the bolts. Whip dampener 180 preferably includes a spherical bearing 210 slidably mounted in hose 190 and rotatably mounted in a race 220 mounted in nut assembly 230. Nut assembly 230 has a nut portion 240 with suitable spaced flats 250 (See FIG. 4) on an integral sleeve portion 260 trapping race 220 therein (crimped at end 270 to accomplish the same). A C-shaped resilient clip 300 snaps into groove 301 in assembly 230 to retain the same to bracket 130.

Bracket 404 in FIG. 2 is the preexisting frame bracket of the vehicle mounted to the vehicle chassis (comparable to bracket 13 in U.S. Pat. No. 5,460,247). Auxiliary bracket 400 has an aperture therethrough aligned with a like aperture in frame bracket 404. Hose 190 passes through crimp sleeve 405, 406, the aligned apertures in brackets 400, 404, lock washer 407 and collar 408. Collar 408 is integral with nut 406 and has a flange 409 abutting against washer 407. Collar 408 is also threaded on its interior for receiving a threaded end 410 of rigid tubing 411, which is an enlarged tapered end 420 as is well known in the art and seen in dotted lines in FIG. 2. This retains hose 190 in collar 408, which is a standard item on the vehicle brake master cylinder assembly.

It can be seen that there is disclosed a bracket assembly for a whip dampener which includes a spring allowing one to shorten the distance the ball 210 moves. Use of the special bracket assembly herein reduces the number of parts used in the assembly of my U.S. Pat. No. 5,460,247.

The whip dampener assembly herein is moved away from the vehicle frame and existing vehicle mounting frame and the car wheel using auxiliary brackets. In the system disclosed in U.S. Pat. No. 5,460,247, there is a requirement that the same hose extends past the car frame in order to obtain the necessary flexing desired to avoid fraying of the braid of the hose. The system herein increases the flexing of the hose further diminishing fraying potential. It is easier to install since no modification of a tubing and hose on the other side of the existing vehicle frame and hose mount bracket is necessary. The stock assembly of a conventional vehicle up to the vehicle bracket and straight tubing need not be modified.

In operation, the dynamic misalignment capability provided by bearing 210 and its assembly acts as a whip dampening means for the hose 190. Such an assembly, in testing, far exceeds the fatigue requirement of the DOT as heretofore stated.

Installation of hose 190, whip dampening means 230, and bracket assembly 180 is quick and easy. Such installation may be effected by either replacement of the entire original equipment, as discussed in U.S. Pat. No. 5,460,247. Alternatively, substitution of the original equipment flexible hose with an assembly of the flexible stainless steel braid protected extruded Teflon hose 190 of suitable length with suitable end fittings, the apparatus taking the place of the original equipment fastened to the original equipment mounting bracket 40, 41.

The unique features of the invention are two:
1) the invention allows flexible brake hoses of stainless steel braid protected extruded Teflon hose to pass the whip resistance test of the U.S. Department of Transportation Basic Motor Vehicle Safety Standard 106 Section 56.3, and
2) the invention utilizes whip dampening means which clips into the original equipment attachment bracket 404.

Preferably, such a flexible brake hose assembly includes a stainless steel braid protected extruded Teflon hose. Although a spherical bearing 210 and its related parts has been disclosed for the whip dampening means 230, any suitable means allowing for whipping of hose 190 as it passes through bracket 404 without damaging the same may be used, such as a suitable shaped bushing or an elastic grommet.

The invention can be quickly and easily applied to any pre-existing original equipment bracket. For example, as many as 12 differently sized brackets may be known as original equipment in the vehicle art. The invention herein relates the number of brackets that are necessary. A suitable sized bearing assembly or grommet is thus chosen.

I claim:

1. In a hose system for the brakes of a vehicle adapted to extend between a brake caliper and a brake master cylinder of the vehicle through a first bracket on the vehicle comprising:

a hose; and whip dampening means associated with said bracket of the vehicle, said whip dampening means including a bearing assembly adapted to be disposed within a first opening in said bracket, said bearing assembly having a bearing rotatably mounted within said bearing assembly, said bearing having a hole therein, said hose passing through the hole in said bearing, said bearing assembly being slidably mounted on said hose, wherein the improvement comprises:

said whip dampening means further including a resilient assembly having a second bracket substantially aligned with and longitudinally spaced from said first bracket, said second bracket having a second opening therein substantially aligned with said first opening, said hose also passing through said second opening, a resilient means having a longitudinal axis adapted to interconnect said first and second brackets.

2. In the system of claim 1 wherein said resilient means is a coiled spring spaced from said hose and said longitudinal axis of said spring being generally parallel to the longitudinal axis of said hose.

3. In the system of claim 2 wherein there is a bolt having an enlarged head and an integral shaft extending through each of said respective openings in said first and second brackets in a direction toward the other bracket, and said spring encircling said shafts.

4. In the system of claim 1 wherein said second bracket is adapted to be secured to said first bracket by a nut and sleeve combination having a throughbore with said hose passing through said nut of said combination of said second bracket and said first bracket, said hose having a tapered end terminating inside said nut and sleeve combination opening into said sleeve, the interior of said sleeve being threaded for receiving the threaded end of rigid straight tubing adapted to extend from the brake master cylinder of said vehicle.

5. In the system of claim 4 including said sleeve having a peripheral flange, and a lock washer encircling said sleeve between said peripheral flange and said vehicle frame.

6. In the system of claim 5 including a crimp sleeve disposed between said first and second brackets having said hose passing therethrough, said sleeve abutting against said nut and sleeve combination and crimping said hose therebetween.

7. In the system of claim 1 including a straight rigid steel hollow tube adapted to be coupled at one end to said brake master cylinder and at the other end, which is threaded, to a nut and sleeve combination mounted to said second bracket, said sleeve of said nut and sleeve combination being threaded on its interior receiving said threaded end of said tube therein.

\* \* \* \* \*